(12) United States Patent
Vishkin

(10) Patent No.: US 7,707,388 B2
(45) Date of Patent: Apr. 27, 2010

(54) COMPUTER MEMORY ARCHITECTURE FOR HYBRID SERIAL AND PARALLEL COMPUTING SYSTEMS

(75) Inventor: Uzi Vishkin, Potomac, MD (US)

(73) Assignee: XMTT Inc., Potomac, MD (US)

( * ) Notice: Subject to any disclaimer, the term of this patent is extended or adjusted under 35 U.S.C. 154(b) by 819 days.

(21) Appl. No.: 11/606,860

(22) Filed: Nov. 29, 2006

(65) Prior Publication Data

US 2009/0119481 A1      May 7, 2009

Related U.S. Application Data

(60) Provisional application No. 60/740,255, filed on Nov. 29, 2005.

(51) Int. Cl.
  *G06F 15/76* (2006.01)
(52) U.S. Cl. .............................. 712/207; 710/5; 711/5; 712/10; 712/16; 712/225
(58) Field of Classification Search ............... 711/5, 711/129, 213; 712/8, 9, 10, 11, 12, 13, 14, 712/15, 16, 17, 18, 19, 20, 21, 22, 207, 225; 710/5
See application file for complete search history.

(56) References Cited

U.S. PATENT DOCUMENTS

| | | | | |
|---|---|---|---|---|
| 5,197,140 | A * | 3/1993 | Balmer | ........................ 711/220 |
| 5,968,160 | A * | 10/1999 | Saito et al. | ..................... 712/14 |
| 6,321,330 | B1 * | 11/2001 | Doshi et al. | .................. 712/241 |
| 6,463,527 | B1 | 10/2002 | Vishkin | |
| 6,532,521 | B1 * | 3/2003 | Arimilli et al. | ............... 711/137 |
| 6,542,918 | B1 | 4/2003 | Vishkin | |
| 6,768,336 | B2 | 7/2004 | Vishkin et al. | |

OTHER PUBLICATIONS

Vishkin, Uzi; "Developing a Computer Science Agenda for High-Performance Computing"; The Univ. of Maryland, ACM Press; 1994; pp. 1-6.

(Continued)

*Primary Examiner*—William M Treat
(74) *Attorney, Agent, or Firm*—Gamburd Law Group LLC; Trellis IP Law Group, PC

(57) ABSTRACT

In one embodiment, a serial processor is configured to execute software instructions in a software program in serial. A serial memory is configured to store data for use by the serial processor in executing the software instructions in serial. A plurality of parallel processors are configured to execute software instructions in the software program in parallel. A plurality of partitioned memory modules are provided and configured to store data for use by the plurality of parallel processors in executing software instructions in parallel. Accordingly, a processor/memory structure is provided that allows serial programs to use quick local serial memories and parallel programs to use partitioned parallel memories. The system may switch between a serial mode and a parallel mode. The system may incorporate pre-fetching commands of several varieties. For example, towards switching between the serial mode and the parallel mode, the serial processor is configured to send a signal to start pre-fetching of data from the shared memory.

39 Claims, 5 Drawing Sheets

OTHER PUBLICATIONS

Gibbons et al.; "Efficient Low-Contention Parellel Algorithms"; SPAA 94 -6/94 Cape May, NJ; 1994 ACM; pp. 236-247.

Culler et al.; "Parallel Computer Architecture"; Morgan Kaufmann Publishers, 1999, Chapter 5, Shared Memory Multiprocessors; pp. 270-271.

Gottlieb, et al.; "The NYU Ultracomputer—Designing an MIMD Shared Memory Parallel Computer"; IEEE Transactions on Computers, vol. C-32 No. 2; Feb 1983; pp. 175-189.

Dally, Bill; "Stream Processing Efficient Computing in the Many-Core Era"; Comp. Sci. Dept., Stanford University; EE380 Seminar; Nov. 1, 2006; pp. 1-45.

Gummaraju, et al.; "Stream Programming on General-Purpose Processors"; Com. Scie Lab., Stanford University; pp. 1-12.

http://www.umiacs.umd.edu/users/viskin/xmt/; Explicit Multi-Threading (XMT); A PRAM-On-Chip Vision; pp. 1-5.

Naishlos, et al. "Towards a First Vertical Prototyping of an Extremely Fine-Grained Parallel Programming Approach"; IBM Haifa Labs, Haifa University Campus; pp. 1-26.

Caragea, George; "Prefetching on XMT"; Version 1.8; Aug. 9, 2006; pp. 1-6.

Vishkin, et al; Explicit Multi-Threading (XMT) Bridging Models for Instruction Parallelism; ACM 1998; pp. 140-150.

Jaja, Joseph; "An Introduction OT Parallel Algorithms"; Addision-Wesley Publishing Company 1992; pp. iii-x.

Vishkin, Uzi; Introcution to the XMT ('Pram-On-Chip') Chip Multiprocessor; pp. 1-37.

* cited by examiner

COMPUTER MEMORY ARCHITECTURE FOR HYBRID SERIAL AND PARALLEL COMPUTING SYSTEMS

CROSS REFERENCES TO RELATED APPLICATIONS

This application claims priority to U.S. Provisional Patent Application Ser. No. 60/740,255, filed Nov. 29, 2005, inventor Uzi Vishkin, entitled "Computer Memory Architecture Methods for Hybrid Serial and Parallel Computing", which is commonly assigned herewith, the contents of which are incorporated herein by reference in their entirety.

ACKNOWLEDGMENT OF GOVERNMENT SUPPORT

This invention was made with Government support awarded under a grant from National Science Foundation award number 0339489. The Government has certain rights in this invention.

BACKGROUND

Embodiments of the present invention generally relate to computing and more specifically to a computer memory architecture for hybrid serial and parallel computing systems.

Parallelism has provided a growing opportunity for increased performance of computer systems. Many parallel systems are engineered to perform tasks with high or massive parallelism, but are not sufficiently scaleable to effectively support limited parallelism in code, and in particular, do not efficiently process serial code. In many applications, however, it is necessary to perform both serial and parallel processing. For example, contemporary personal computers (PCs) use a graphics processing unit (GPU) and a central processing unit (CPU) within the same system. The GPU is typically a separate subsystem from the CPU subsystem and each may be made by a different manufacturer and be provided on a different circuit board with dedicated resources. The GPU handles (among other things) the parallel processing of data streams while the CPU handles, among other things, user inputs, control and management of the GPU operation, etc.

These conventional approaches often do not allow for efficient execution of coordinated, mixed (i.e., "hybrid") parallel and serial processing modes. For example, memory management functions, such as partitioning, cache levels, and consistency management, and so on, could be optimized differently in a parallel computing system as opposed to a serial computing system. Because different cache arrangements and techniques may be used in each mode, transitioning among processing modes is non-trivial and requires time and resources, as well as overall system organization.

SUMMARY

Particular embodiments generally relate to a computing system including a serial processor and a plurality of parallel processors configured to switch between serial processing and parallel processing. This may allow efficient computation of serial processing, parallel processing or any mix of the two including primarily serial computing, or primarily parallel computing. The system architecture provides seamless transitions between parallel and serial processing modes, while maintaining memory coherence and providing sufficient performance for streaming applications.

In particular embodiments, a serial processor controls transitions from a serial processing mode to a parallel processing mode implemented by a plurality of parallel processors. To provide a substantially seamless transition, to provide memory coherence, and to support streaming or other advanced operations, the particular embodiments provide several unique and novel features. In particular embodiments, prior to a transition from a serial processing mode to a parallel processing mode, the serial processor is adapted to broadcast several different signals and to ensure that only updated data is used in the parallel processing mode.

First, prior to a transition from a serial processing mode to a parallel processing mode, the serial processor provides for a transfer of updated data from serial memory to at least one of a plurality of partitioned memory modules used in the parallel processing mode, referred to as "data flushing", typically provided from say an L1 cache of the serial memory. Updated data may be data from the serial memory or updated data accessible in the parallel processing mode. A compiler may be able to mark some data as not accessible in the subsequent parallel mode and free the serial mode from the need to confirm its update before transitioning to parallel mode. Similarly, a compiler may be able to mark some data as not accessible in the subsequent serial mode and free the parallel mode from the need to confirm its update before transitioning to serial mode. In addition, prior to broadcasting a "spawn" command to the plurality of parallel processors to initiate a parallel processing mode, to ensure memory coherence, the serial processor is required to receive a corresponding acknowledgement from the at least one of the plurality of partitioned memory modules that the updated data has been queued or committed prior to any memory requests from the plurality of parallel processors. This latter feature accommodates timing differences that may have occurred in data transferring through an interconnection network. In most instances during operation, the data transfer to and receipt of acknowledgements from may be from all affected partitioned memory modules. In addition, also prior to a transition from a serial processing mode to a parallel processing mode, the serial processor broadcasts a prefetching signal to the plurality of parallel processors to initiate prefetching of data from at least a portion of the plurality of partitioned memory modules. This data prefetching allows the plurality of parallel processors to have data available, effectively immediately, upon entering parallel processing mode.

With such memory coherence and data prefetching, the plurality of parallel processors may commence parallel processing substantially immediately and concurrently, with updated data available to support the parallel processing, providing substantially improved performance and enabling advanced data operations, such as streaming operations. The serial processor may also broadcast an additional signal to the parallel processors for substantially concurrent initiation of the parallel processing mode. In addition, the transfer of updated data from the serial memory to the plurality of partitioned memory modules may be accomplished through either a data write back operation or a data write through operation.

An one apparatus embodiment comprises: an interconnection network; a plurality of parallel processors coupled to the interconnection network and adapted (or, equivalently, configured) to execute software instructions in the software program substantially in parallel; a plurality of partitioned memory modules coupled to the interconnection network and adapted to store data for use by the plurality of parallel processors in executing the software instructions substantially in parallel; a broadcast network coupled to the plurality of parallel processors; a serial processor coupled to the broadcast network and adapted to execute software instructions in a software program primarily in serial; and a serial memory coupled to the interconnection network and adapted to store data for use by the serial processor in executing the software instructions substantially in serial. In the embodiment, the serial processor is further adapted, prior to a transition from a serial processing mode to a parallel processing mode, to provide for a transfer of updated data from the serial memory to at least one of the plurality of partitioned memory modules, to receive a corresponding acknowledgement from the at least one of the plurality of partitioned memory modules that the updated data has been queued or committed to memory storage prior to any memory requests from the plurality of parallel processors, and to broadcast a first, prefetching signal to the plurality of parallel processors to initiate prefetching of data from at least a portion of the plurality of partitioned memory modules. In addition, the serial processor may further broadcast an additional, second signal to the plurality of parallel processors for substantially concurrent initiation of the parallel processing mode.

In one embodiment, a serial processor is configured to execute software instructions in a software program in serial. A serial memory is configured to store data for use by the serial processor in executing the software instructions in serial. A plurality of parallel processors are configured to execute software instructions in the software program in parallel. A plurality of partitioned memory modules are provided and configured to store data for use by the plurality of parallel processors in executing software instructions in parallel. Accordingly, a processor/memory structure is provided that allows serial programs to use quick local serial memories and parallel programs to use partitioned parallel memories.

The system may transition (or switch) between a serial mode and a parallel mode. Towards switching between the serial mode and the parallel mode, the serial processor is adapted (or configured) to send a signal to start pre-fetching of data from the shared memory into either the shared caches or prefetch buffers, or registers at the processors. The parallel processors can also pre-fetch data on their own into any of these three destinations: the shared caches or prefetch buffers, or registers at the processors. One effect of such pre-fetching of data to registers or pre-fetch buffers, is that at least a portion of the parallel processors can effectively function as or emulate a streaming computer program using the pre-fetched data.

A further understanding of the nature and the advantages of particular embodiments disclosed herein may be realized by reference of the remaining portions of the specification and the attached drawings.

BRIEF DESCRIPTION OF THE DRAWINGS

The objects, features and advantages of particular will be more readily appreciated upon reference to the following disclosure when considered in conjunction with the accompanying drawings, wherein like reference numerals are used to identify identical components in the various views, in which.

DETAILED DESCRIPTION OF EXAMPLE EMBODIMENTS

Figure 1:
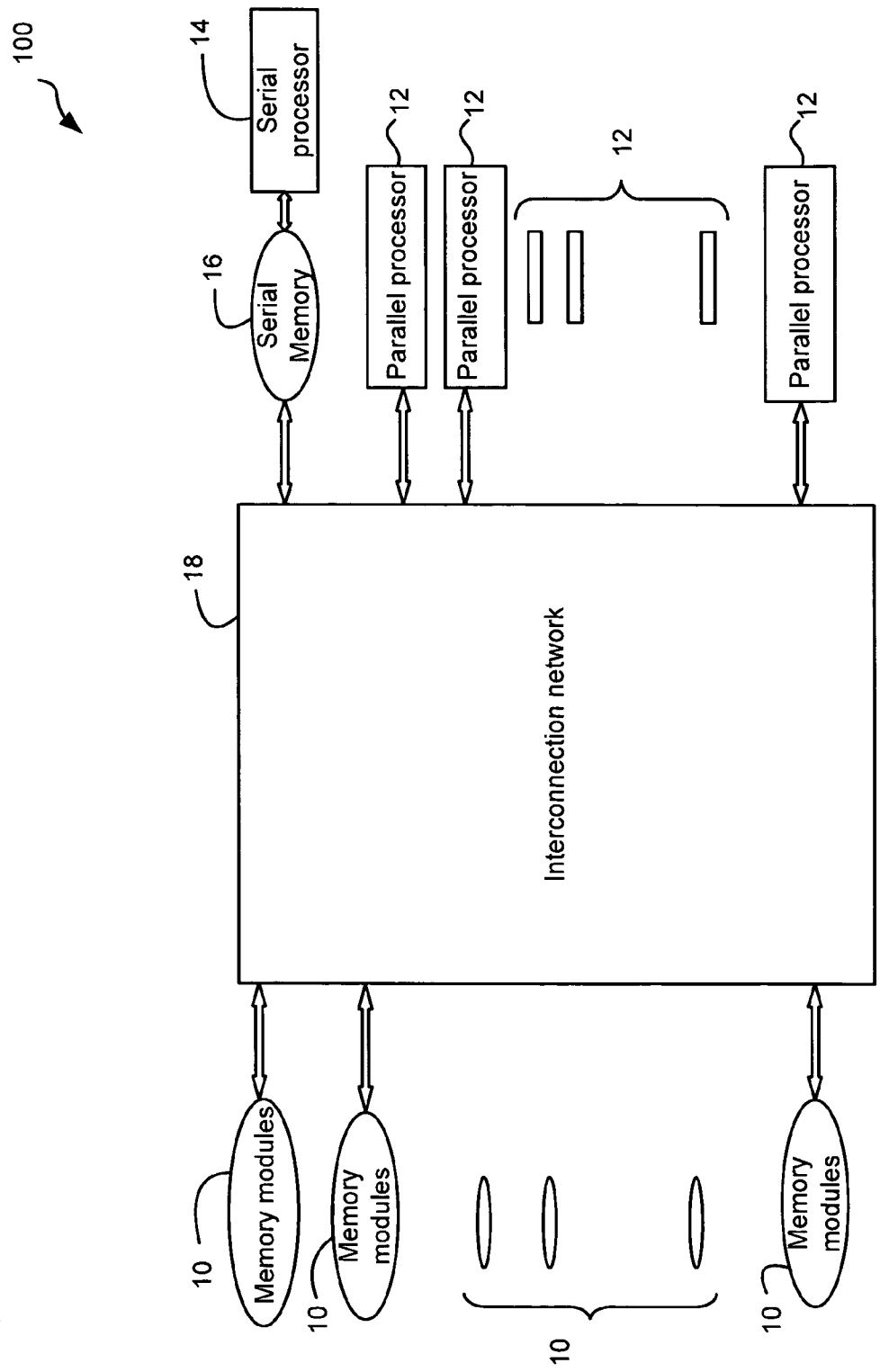
FIG. 1 is a block diagram illustrating an example computing system embodiment.

While the present invention is susceptible of embodiments in many different forms, there are shown in the drawings and will be described herein in detail specific embodiments thereof, with the understanding that the present disclosure is to be considered as an exemplification of the principles of the invention and is not intended to limit the invention to the specific embodiments illustrated. In this respect, before explaining at least one embodiment consistent with the present invention in detail, it is to be understood that the invention is not limited in its application to the details of construction and to the arrangements of components set forth above and below, or as described and illustrated in the drawings. Apparatuses consistent with the present invention are capable of other embodiments and of being practiced and carried out in various ways. Also, it is to be understood that the phraseology and terminology employed herein, as well as the abstract included below, are for the purposes of description and should not be regarded as limiting.

FIG. 1 depicts a computing system 100 according to one embodiment. As shown, system 100 includes a plurality of memory modules 10, a plurality of parallel processors 12, a serial processor 14, a serial memory 16, and an interconnection network 18. It will be understood that a person skilled in the art will appreciate other components that may be included, removed, or modified from those shown or discussed in connection with system 100 or the Figures in general while still remaining within the scope of particular embodiments.

Serial processor 14 is configured to process a software program in serial. For example, software instructions in the software program may be executed serially as in a von Neumann or other sequential architecture, or the like.

Plurality of parallel processors 12 are configured to execute software instructions in a software program in parallel. For example, one or more threads may be provided that may execute instructions in the software program in parallel. Parallel processors 14 may include thread control units (TCUs) that execute threads in parallel. Parallel processors 14 may be included on a single substrate or chip, or multiple chips can be used. In general, the functionality of serial and parallel processors may be achieved in any suitable design including processors, custom or semi-custom circuitry, gate arrays, programmable logic arrays, etc.

Serial memory 16 is configured to store data for serial processor 14. In one embodiment, serial memory 16 includes a cache, such as a first level cache. In one embodiment, serial memory 16 is a private memory in which only serial processor. 14 can access and may write to. Thus, plurality of parallel processors 12 do not access data stored in serial memory 16. Serial memory 16 may provide an upper layer of cache in which data can be accessed quickly by serial processor 14. Lower levels in the memory hierarchy may also be provided in memory modules 10.

Memory modules 10 may be partitioned memory modules. For example, memory modules 10 may be partitioned such that each valid logical address can be found in one module 10. Each module 10 may include a memory hierarchy. For example, a first-level cache and second-level cache may be included in memory module 10. Further, parallel processors 12 may also include memory. For example, local registers, read-only cache, etc. may be included in parallel processor 12. These memories are not private, in that writes cannot be done into them, and data may be loaded from memory modules 10 through interconnection network 18 to memory in parallel processors 12.

Memory address space may be partitioned among memory modules 10. A memory module for each address may be specified. This may eliminate the need to keep values coherent between different memory modules 10. To minimize collisions from accesses by various threads, hashing of memory addresses may be used. A hash function is used to assign virtual addresses to memory modules. For some streaming applications a deterministic function may be used for the distribution that matches the application. The granularity of the memory blocks may also be adapted to the application. The partitioned memory system may be described in more detail in the paper "Towards a First Vertical Prototyping of an Extremely Fine-grained Parallel Programming Approach", by Donit Naishlos, Joseph Nuzman, Chau-Wen Tseng, Uzi Vishkin, TOCS 36 (2003), 521-552 (Special Issue of SPAA2001) (hereinafter, the "Parallel Programming Approach Paper"), which is hereby incorporated by reference for all purposes in its entirety.

Interconnection network 18 may be any interconnection network. For example, interconnection network 18 may include a bus, crossbar switch, a mesh of trees or a hypercube, etc. It will be understood that one or more interconnection networks 18 may be provided for sending data between memory modules 10 and serial processor 14 and parallel processors 12. Also, serial processor 14 may communicate with parallel processors 12 through an interconnection fabric that allows broadcasting single-program multiple data (SPMD) code from the serial processor 14 to parallel processors 12, or the interconnection network 18 or any other network. In other embodiments different memory arrangements can be used. For example, the first level cache for serial processor 14 can reside elsewhere from serial memory 16, one or more parallel processors may be permitted to access serial memory 16, etc. Any suitable partitioning scheme, cache arrangement, interconnection network, bus and layout organization or other design characteristic or approach can be employed.

In one embodiment, system 100 may switch from a serial processing mode to a parallel processing mode, and vice versa. In this case, serial processor 14 may be processing software instructions serially. When a parallel processing mode is desired, plurality of parallel processors 12 take over processing the software instructions in the software program. The software instructions are then processed in parallel.

Figure 2:
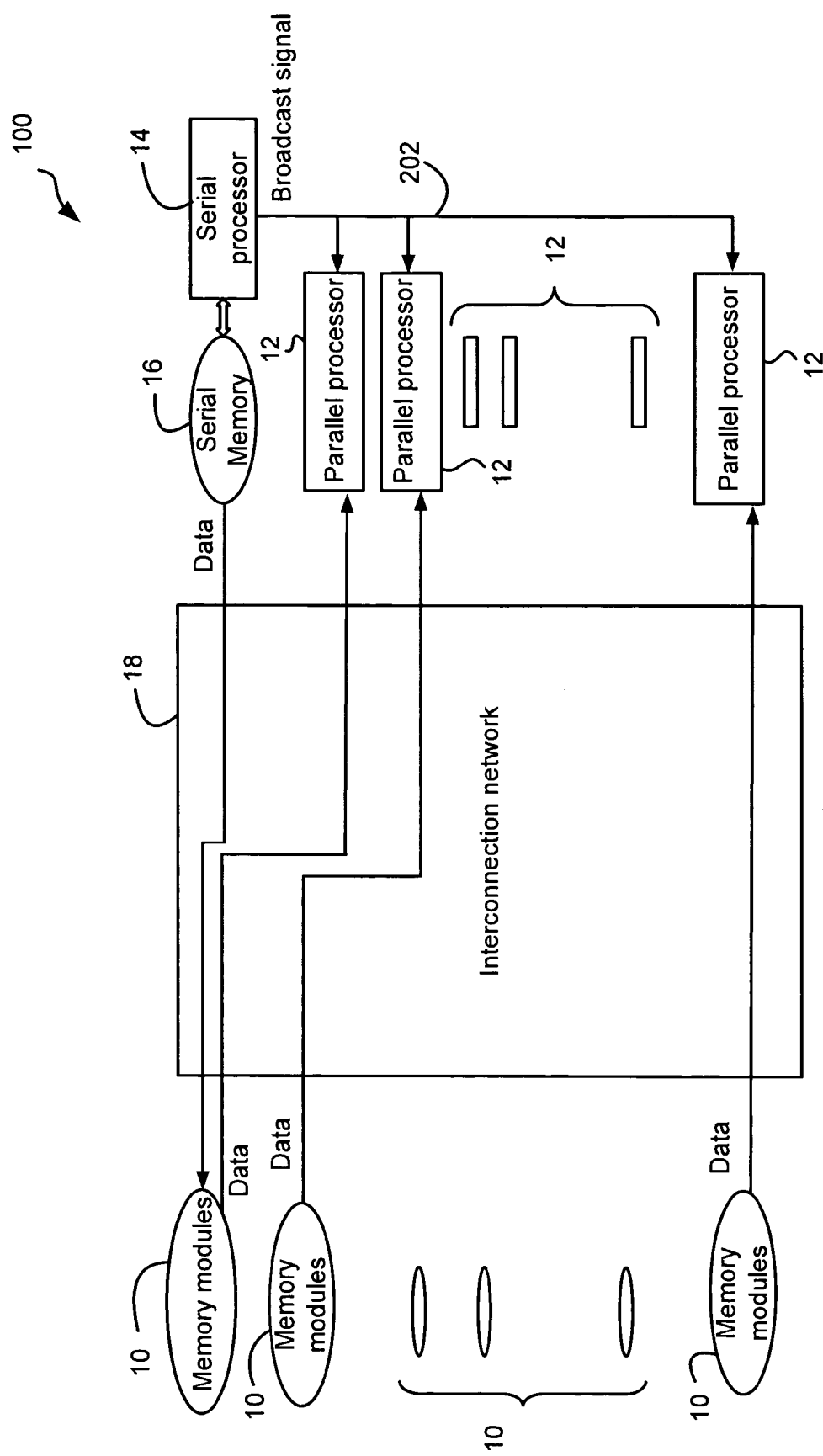
FIG. 2 is a block diagram illustrating example switching from the serial processing mode to the parallel processing mode in an example computing system embodiment.

When the switch from serial processing mode to parallel processing mode is going to occur, serial processor 14 may send a signal to parallel processors 12 to indicate an upcoming switch to the parallel processing mode. In this case, parallel processors 12 may start pre-fetching data and instructions (though a primary source for instructions at the parallel processor is through broadcast from the serial processor, as depicted in FIG. 2) from parallel memory modules 10. The pre-fetched data may be stored in parallel processors 12 and be ready for quick access once the parallel mode is entered into. In this way, parallel processors 12 may effectively function as a (or emulate) streaming architecture by using the pre-fetched data. In streaming processing, data is generally dispatched towards processing units at a constant rate and processed at a constant rate. Pre-fetching data makes the data available to execute instructions at the processors 12 at a much higher rate than without pre-fetching. The rate may be primarily dictated by the memory architecture and the interconnection network and one embodiment seeks a high rate that is competitive with a streaming processor.

The inclusion of serial memory 16 in addition to memory modules 10 provides a novel feature to particular embodiments. Serial memory 16 provides quick access to data for serial processor 14. This is a private memory for use by serial processor 14. Thus, instead of incurring the latency to retrieve data from memory modules 10 through interconnection network 18, the data can be quickly retrieved from serial memory 16. However, because serial memory 16 is not accessible to parallel processors 12, serial memory is flushed when the switch to the parallel processing mode occurs. Thus, data in serial memory 16 is sent to memory modules 10. Parallel processors 12 can access data from memory modules 10.

System 100 provides better performance using the memory architecture. Memory requests can travel to any memory location within the memory modules. Typically, a latency cost for such memory access is incurred. The "independence of order semantics (IOS)" of threading permits such latency to be tolerated. The IOS permits each thread to progress at its own speed from a spawn to a join without having to wait for other threads. IOS does not inhibit progress irrespective of the order in which parallel memory requests are satisfied allowing more parallel memory requests. Additionally, using pipelining over a high bandwidth interconnect to minimize the memory stalls due to high latency is a known idea in parallel computing. This provides a key to understanding why even significant latencies do not inhibit high performance. The support of simultaneous requests by pipelining throughout a powerful all electronic interconnection network 18 overcomes problems: providing a centralized scheduling resource to coordinate communication would be costly for large design. Driving a fast global clock across a deep sub-micron chip is one possibility for an embodiment, though it is power consumptive. Other particular embodiments use a more decentralized routing scheme. Such a decentralized routing scheme is described in more detail in Parallel Programming Approach Paper. FIG. 2 shows an example of switching from the serial processing mode to the parallel processing mode according to one embodiment of the present invention. As shown, serial processor 14 broadcasts a signal to other parallel processors 12. The signal may be broadcast through a broadcast fabric 202. In one embodiment, broadcast fabric 202 may be different from interconnection network 18 and allows serial processor 14 to communicate with parallel processor 12. For example, switches between serial and parallel mode may be communicated, instructions may be communicated, etc. Also, it will be understood that interconnection network 18 may also be used equivalently.

The structure of including serial memory 16 for use by serial processor 14 provides a novel structure. When system 100 switches from serial mode to parallel mode, data stored in serial memory 16 is sent to parallel memory modules 10. This is so any data in serial memory 16 can be accessed by parallel processors 12. Serial memory 16 is a private memory and may not be accessible by parallel processors 12. Accordingly, serial memory 16 is flushed and data sent to memory modules 12.

Instructions may be sent on broadcast fabric 202 to parallel processors 12. In one embodiment, the instructions may be sent as described in the Parallel Programming Approach Paper.

Memory modules may have different levels of cache. For example, a first-level and second-level cache may be provided. In one embodiment the memory incorporates a shared cache architecture (see Culler and Singh, Parallel Computer Architecture, Morgan-Kauffman, 1999, pp 271), which is hereby incorporated by reference in its entirety for all purposes, where parallel processors share already the first level of their (read/write) cache. In this architecture each logical address resides in exactly one of the parallel memory modules 10. The shared cache approach simplifies the cache coherence problem because all writes to an address may be to a shared cache holding the address.

The parallel memory modules 10 are accessed by parallel processors 12. Parallel processors 12 pre-fetch data, or instructions, from memory modules 10 upon receiving a command to prefetch data, or instructions. This is described in more detail below.

Figure 3:
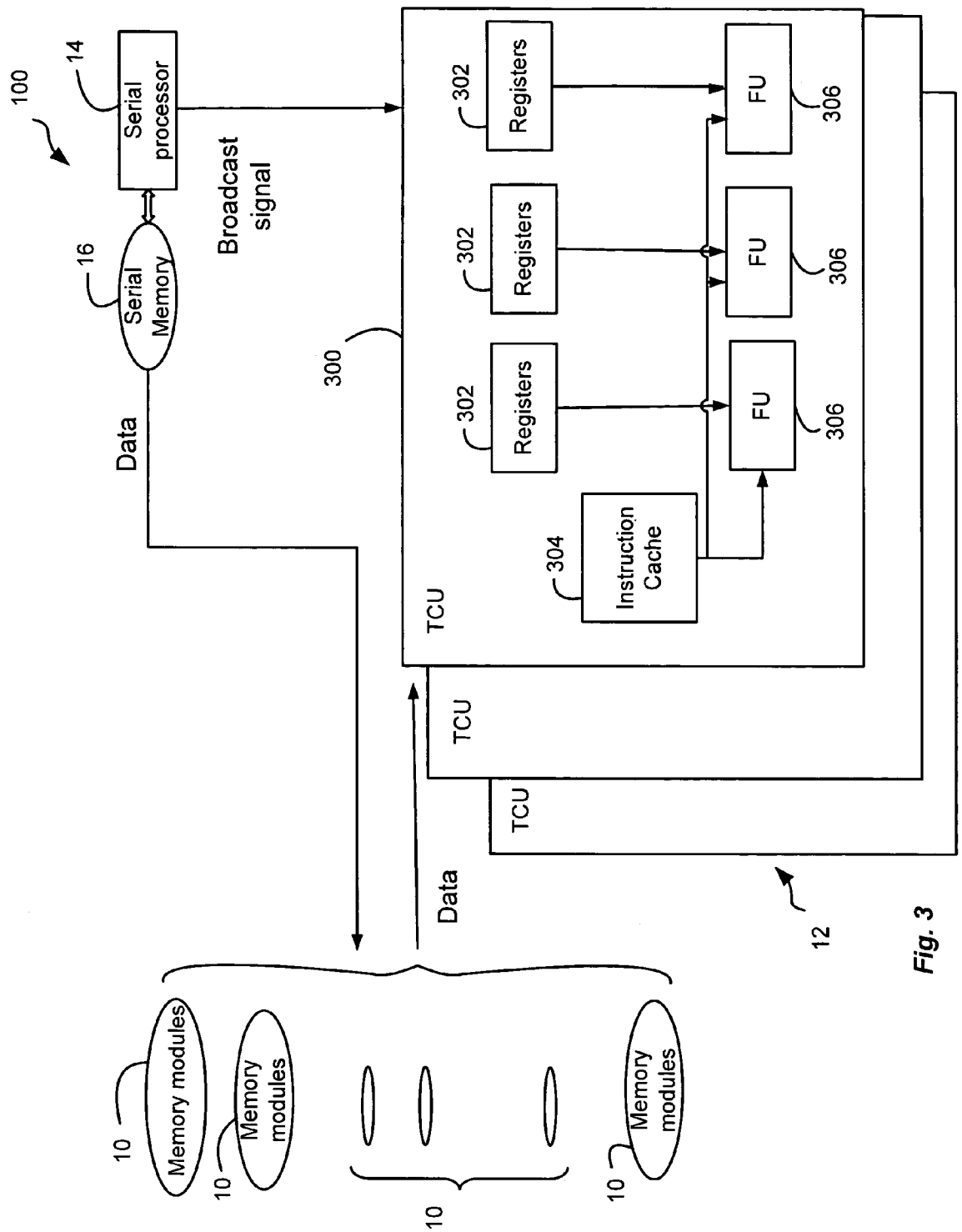
FIG. 3 is a block diagram illustrating in greater detail an example embodiment of a parallel processor.

FIG. 3 shows a more detailed embodiment of system 100. Each parallel processor 12 may include multiple thread control units (TCUs) 300. These may be clustered together to perform parallel processing. In one embodiment, each TCU 300 in parallel processor 12 executes a different thread.

As shown, a TCU 300 includes one or more registers 302, an instruction cache 304 and functional units 306. Registers 302 may be any local storage in parallel processors 12 and may be read-only. Also, registers 302 may not be found in parallel processors 12 but may be found near them. For example, read-only caches that are near parallel processors 12 may be provided. Also, registers 302 may be registers but may also be other forms of storage, such as buffers, cache, etc. The pre-fetched data is retrieved from memory modules 10 and stored in registers 302.

Functional units 306 are configured to perform operations for instructions from instruction cache 304. For example, software instructions from a software program may be stored in instruction cache 304. They may be loaded into functional units 306 and executed. In one embodiment, functional units 306 retrieve the necessary data from registers 302 to perform the operations for the software instructions As mentioned above, functional units 306 may effectively perform as (or emulate) a streaming architecture. In this case, data is pre-fetched into registers 302 such that data may be sent to functional units 306 at a constant rate, or by the rate at which pre-fetch of data is executed. Functional units 306 may then execute the software instructions in a streaming manner. For example, the instructions can be executed such that either a constant stream of output data is maintained, or by the rate at which pre-fetch of data is executed.

Serial processor 14 may play the role of a master processor by orchestrating the operation of a program. When a switch to parallel mode is determined to be needed, serial processor 14 may trigger the change to the parallel processing mode. Serial processor 14 may handle the cache coherence among memories along parallel mode access to shared variables that need protection of cache coherence protocol. In some cases, there are several parallel processors 12, each running serial code that could use any cache coherence protocol. Serial processor 14 plays the role of a "master processor" orchestrating the operation of an SPMD program over a group of parallel processors 12. Serial processor 14 can still participate in a cache coherence protocol with respect to one or more processors 14 that operate either as serial processor, or as master processors for a group of parallel processors 12. In case some master processors are in parallel mode and others in serial mode, in one embodiment, an orthogonal system component comprising the master processors handles cache coherence among memories of different master processors while in parallel mode access to shared variables that need protection of a cache coherence protocol may not be sought.

Figure 4:
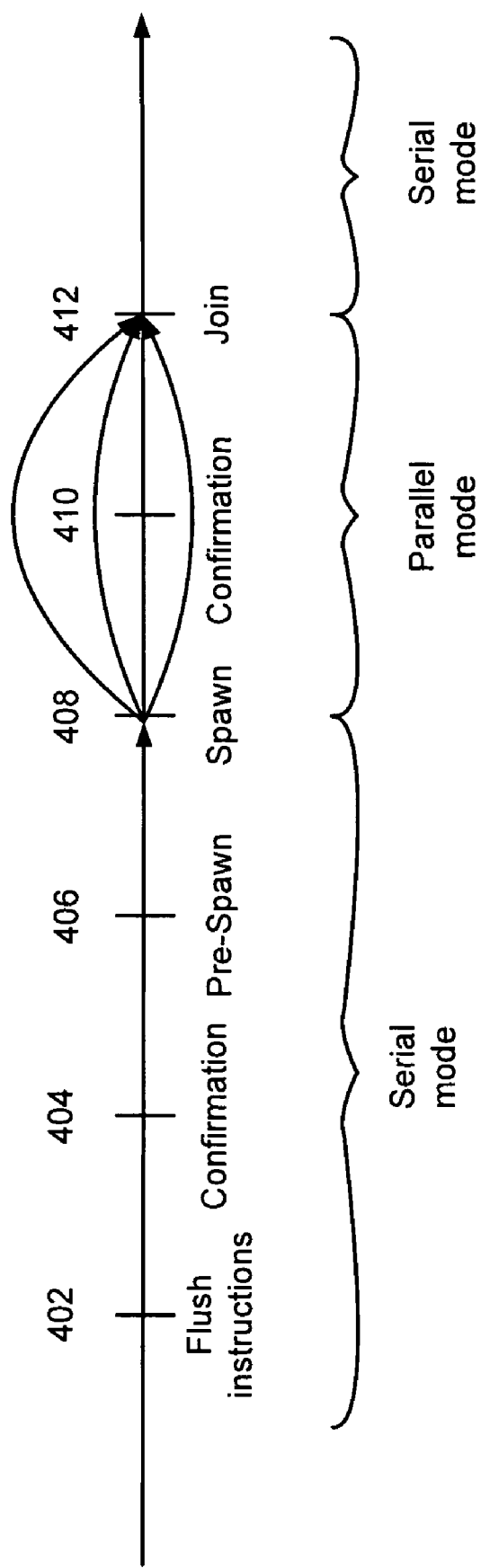
FIG. 4 is a diagram illustrating an example timeline and transitions between serial and parallel processing modes for a programming model for an example software program.

FIG. 4 illustrates a command timeline and shows an example of transitions for a programming model for a software program according to one embodiment. As shown, system 100 switches from the serial mode to the parallel mode, and vice versa. In this case, spawn and join commands are used to perform the switches. In one embodiment, the spawn and join commands may be part of a single program multiple data (SPMD) parallel random access machine (PRAM) like programming model. PRAM is an abstract shared algorithmic model in which it is assumed that a plurality of requests to memory can be satisfied at the same time as one request. In other embodiments, other models or design approaches can be used.

One embodiment of the programming model is based on a hybrid of several variants of the PRAM model. One motivating variant is arbitrary concurrent-writes where a plurality of writes into the same memory location results in one of these writes, but which one may not be known in advance. Another variant queue-read queues read requests to the same memory location. Yet another one is queue-write that queues write requests to the same memory location. On one hand arbitrary concurrent writes provide a useful abstraction for the PRAM algorithms theory. On the hand queue-read and queue-write better represent the situation in some embodiments. However, queue-write would create a consistency problem where the same address has different values over a time period where the arbitrary concurrent-write assumption allows just one change from the value prior to the write to the value after the write. To reconcile this, another variant a prefix-sums (PS) command needs to be defined. A PS command has the form PS A Bi at processor i, where A is a shared memory address and Bi is local to a processor i. The result being that A becomes A+Bi, while Bi gets the original value of A. Given such concurrent commands at several processors the result would be as if they are executed in some arbitrary order. For example, concurrent execution of PS A B1, PS A B3 and PS A B6, will always result in A becoming A+B1+B3+B6. One possible assignment to B1, B3 and B6, could be B1 gets the original value of A, B3 gets the sum of the original values of A and B1, and B6 gets the sum of the original values of A and B1 and B3. A second possible assignment could be B6 gets the original value of A, B3 gets the sum of the original values of A and B6, and B1 gets the sum of the original values of A and B6 and B3. The four other permutations for B1, B3, and B6 are also possible. The implementation of arbitrary concurrent-writes follows by adding an initially zero gatekeeper variable for every address into which concurrent-writes may be performed. The implementation proceeds by using a PS command with an increment of one with respect to the gatekeeper variable. Only one of the attempting processors will get back a value of zero. This serial processor will do the write, completing the arbitrary concurrent-write implementation. The role that IOS is playing in this approach should be clear.

As discussed above, in advance of the transition to a parallel processing mode, memory coherence is ensured, and several additional signals are broadcast to the parallel processors. As illustrated, the serial processor provides for a transfer of updated data from the serial memory to the plurality of partitioned memory modules 10, and may utilize either a data write back operation or a date write through operation. To ensure that the most updated data will be utilized for parallel processing, the serial memory is adapted to receive corresponding acknowledgements from the plurality of partitioned memory modules that the updated data has been queued or committed to be stored in memory, prior to any memory requests from the plurality of parallel processors. Updated data may be data from the serial memory or updated data accessible in the parallel processing mode. A compiler may be able to mark some data as not accessible in the subsequent parallel mode and free the serial mode from the need to confirm its update before transitioning to parallel mode. Similarly, a compiler may be able to mark some data as not accessible in the subsequent serial mode and free the parallel mode from the need to confirm its update before transitioning to serial mode. Serial processor 14 also broadcasts a prefetching signal to the plurality of parallel processors to initiate prefetching of data from at least a portion of the plurality of partitioned memory modules 10.

As discussed above, in advance of the transition to a parallel processing mode, memory coherence is ensured, and several additional signals are broadcast to parallel processors 12. As shown in FIG. 4, system 100 is operating in serial mode. At 402, a flush instruction step is performed. Serial processor 14 provides for a transfer of updated data from serial memory 16 to the plurality of partitioned memory modules 10, and may utilize either a data write back operation or a date write through operation. To ensure that the most updated data will be utilized for parallel processing, serial memory 16 is adapted to receive corresponding acknowledgements at confirmation 404 from at least one of the plurality of partitioned memory modules that the updated data has been queued or committed to be stored in memory, prior to any memory requests from the plurality of parallel processors 12.

Serial processor 14 also broadcasts a prefetching signal to the plurality of parallel processors to initiate prefetching of data from at least a portion of the plurality of partitioned memory modules 10 at pre-spawn step 406. Although the steps of FIG. 4 are shown in a time-line, it will be understood that the steps may be performed in a different order. For example, step 406 may be performed prior to step 402 or step 404 as long as the order of the steps is performed in such a way that the processing of software instructions is correctly performed. This can be done in one of several ways. In each of these ways, the data to be pre-fetched may be either specified or implied. For example, the serial code may include instructions that may be an early spawn. This may be executed before a spawn command is reached and the instructions are sent to parallel processors 12. The instructions include information on data to pre-fetch.

Serial processor 14 may still execute serial code while the pre-fetching is being performed. When the spawn command is reached, serial processor 14 may broadcast a command to change over from the serial processing mode to the parallel processing mode.

In one example, if the signal goes to parallel processors 12, it may be executed as a pre-spawn command initiating a "faux" or "pre" thread at each participating TCU and an SPMD code with one or more pre-fetch commands. Each pre-fetch command specifies one or more memory addresses that needs to be pre-fetched and whether the prefetching has to be done into the shared cache or into the TCUs. This pre-thread may be replaced by a real thread once the TCU receives a signal from serial processor 14 following the execution of a Spawn command by the serial processor 14.

Serial processor 14 may also broadcast another signal to plurality of parallel processors 12 for substantially concurrent initiation of the parallel processing mode at spawn step 408.

Data may be pre-fetched from memory modules 10 into parallel processors 12. When the threads are spawned, data may already have been pre-fetched into registers 302. Thus, data may be sent to functional units 306 at a constant rate, or the rate allowed by the overall computing system. Functional units 306 may be able to process the instructions from instruction cache 304. This may be done in a streaming manner as enough data may have been pre-fetched into registers 302 such that operations may be performed to emulate streaming. In one embodiment, TCUs 300 may not be able to start processing instantly when a spawn command is received. Thus, the time that it takes TCUs 300 to become ready to execute instructions is used to pre-fetch data. Alternatively, a TCU 300 may use a pre-fetch command during the execution of a thread towards the time data is needed.

The pre-fetching of data predicts which data may be needed by each TCU 300. This is done by either having explicit pre-fetch instructions inserted by the compiler, or programmers, or by having the hardware look ahead at the instructions that need to be executed in parallel. Thus, the proper data may be retrieved from memory modules 10. When the spawn command is reached, the system 100 changes to the parallel mode and threads 404 are spawned.

Before transitioning back to serial mode, to ensure that the most updated data will be utilized for serial processing, each parallel processor 12 is adapted to receive corresponding acknowledgements at confirmation 410 from the plurality of partitioned memory modules that data from it will be committed to memory modules 10. The transition back to parallel mode may not be performed until is in ensured that writes have been committed to be stored or queued. This ensures that any data accessed from memory modules 10 for serial memory 16 is updated.

Each TCU 302 may be assigned a virtual thread to execute. Upon termination, TCU 302 may receive a new virtual thread to execute. All TCUs repeat this process until all the outstanding parallel virtual threads have been completed.

The virtual threads created by a spawn command and terminated by a join command may share the same code at the join step 412. Each thread terminates when the join command is reached. Once the join command has been reached by all outstanding parallel virtual threads, system 100 transitions from the parallel mode to the serial mode, as per 412. This process may continue as described above when system 100 moves from serial processing mode to parallel processing mode.

All TCUs 302 independently execute a serial program in parallel. Each can accept instructions and execute them. The memory structure of system 100 supports simultaneous access by many threads to locations in partitioned memory modules 10. By having many small memory modules 10, many threads can be satisfied at once. Pipelining through interconnection network 18 allows more simultaneous requests to be supported.

Figure 5:
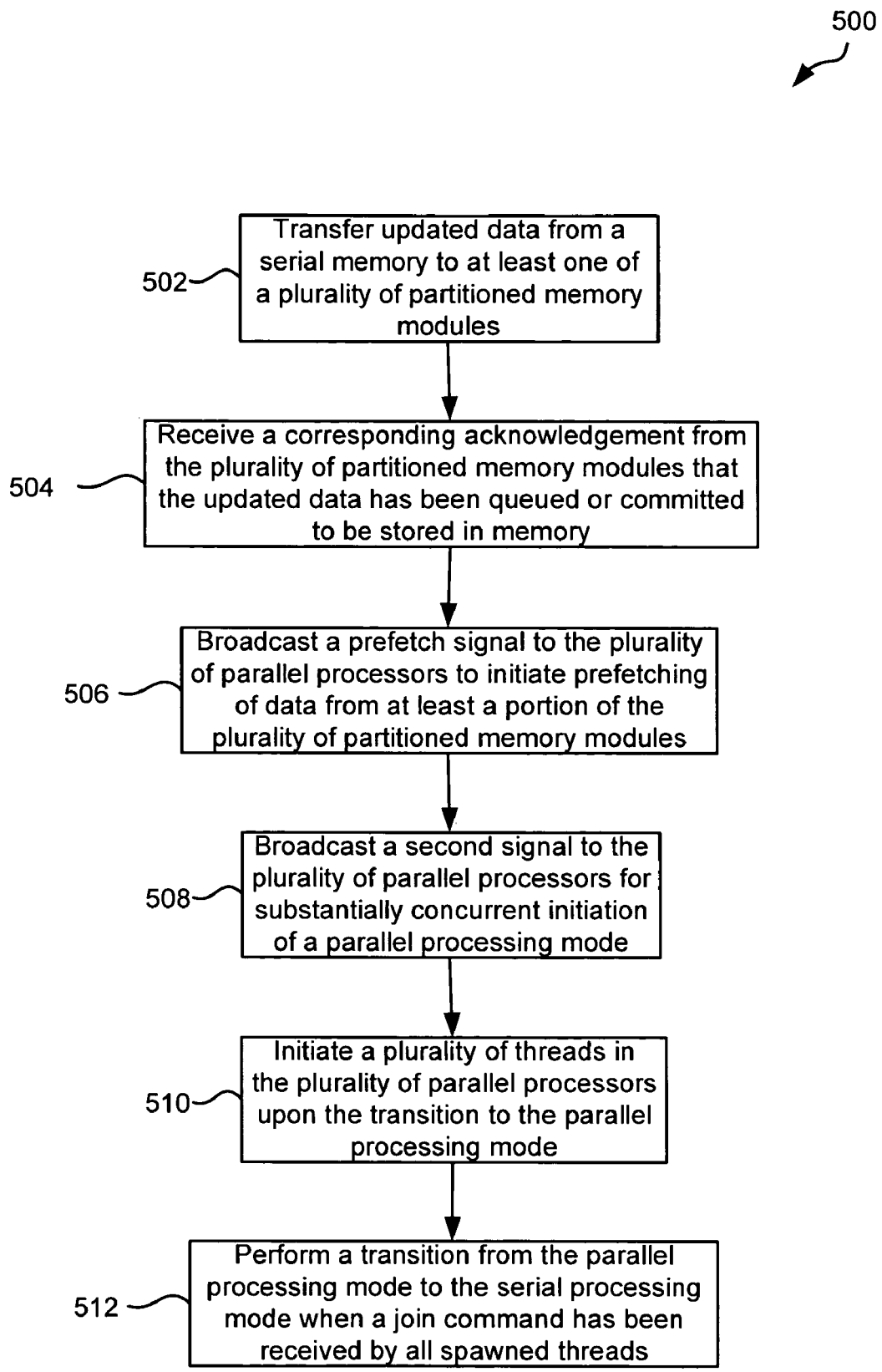
FIG. 5 depicts a simplified flowchart for transitioning from a serial processing mode to a parallel processing mode according to one embodiment.

FIG. 5 depicts a simplified flowchart 500 for transitioning from a serial processing mode to a parallel processing mode according to one embodiment. Although the steps of FIG. 5 are shown in a time-line, it will be understood that the steps may be performed in a different order. For example, step 506 may be performed prior to step 502 or step 504. as long as the order of the steps is performed in such a way that the processing of software instructions is correctly performed. Step 502 transfers updated data from a serial memory to at least one of a plurality of partitioned memory modules.

Step 504 receives a corresponding acknowledgement from the at least one of the plurality of partitioned memory modules that the updated data has been queued or committed to be stored in memory, prior to any memory requests from the plurality of parallel processors. The transfer of updated data from the serial memory to the plurality of partitioned memory modules may be a data write back operation or a data write through operation.

Step 506 broadcasts a prefetch signal to the plurality of parallel processors to initiate prefetching of data from at least a portion of the plurality of partitioned memory modules. The prefetch signal may cause initiation of prefetch threads that are configured to prefetch data from partitioned memory modules 10.

Step 508 broadcasts a second signal to the plurality of parallel processors for substantially concurrent initiation of a parallel processing mode.

Step 510 initiates a plurality of threads in the plurality of parallel processors upon the transition to the parallel processing mode. Instructions may be processed in a streaming manner using the prefetched data (and any other data that is fetched).

Step 512 performs a transition from the parallel processing mode to the serial processing mode when a join command has been received by all spawned threads. Data may be loaded from the plurality of partitioned memory modules into the serial memory upon a transition from the parallel processing mode to the serial processing mode.

Accordingly, a processor/memory structure is provided that allows serial programs to use quick local cache memories and parallel programs to use partitioned parallel memories. Particular embodiments provide the ability to efficiently switch between serial runs, whether as a serial program, or as a section of a parallel program, and parallel runs. Prefetching can also be incorporated. In particular, prefetching allows a streaming architecture to be emulated. Much of the functionality performed using a streaming architecture can be moved to processors that replace streaming with memory prefetching.

A migration path that will allow users to use new generations of increasingly parallel processors as they become available for improved single task performance as well as provide competitive support for existing serial code is provided by particular embodiments. Particular embodiments provide improved parallel performance and migration path for multi-core special- or general-purpose architectures.

Although the description has been described with respect to particular embodiments thereof, these particular embodiments are merely illustrative, and not restrictive. For example, "data" can include different types and amounts of information such as data, meta-data, executable instructions, etc. Thus, a cache or memory operation described with respect to data can similarly be adapted for an instruction cache. Other embodiments are possible. Also, although a hard switch from the serial processing mode to the parallel processing mode is described, it will be understood that switching between primarily serial processing to primarily parallel processing, or even switching from only serial or parallel to a hybrid of serial/parallel, from the hybrid back to singular (serial or parallel processing), and any other variation may be used. Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

I claim:

1. An apparatus comprising:
a serial processor adapted to execute software instructions in a software program primarily in serial;
a serial memory adapted to store data for use by the serial processor in executing the software instructions primarily in serial;
a plurality of parallel processors adapted to execute software instructions in the software program primarily in parallel; and
a plurality of partitioned memory modules adapted to store data for use by the plurality of parallel processors in executing the software instructions primarily in parallel;
wherein the serial processor is further adapted, prior to a transition from a serial processing mode to a parallel processing mode, to provide for a transfer of updated data from the serial memory to at least one of the plurality of partitioned memory modules and to receive a corresponding acknowledgement from the at least one of the plurality of partitioned memory modules that the updated data has been queued or committed prior to any memory requests from the plurality of parallel processors.

2. The apparatus of claim 1, wherein the serial processor is further adapted to broadcast a first signal to the plurality of parallel processors for substantially concurrent initiation of the parallel processing mode.

3. The apparatus of claim 1, wherein the transfer of updated data from the serial memory to the plurality of partitioned memory modules is a data write back operation or a data write through operation.

4. The apparatus of claim 1, wherein the serial processor is further adapted, prior to a transition from a serial processing mode to a parallel processing mode, to broadcast a prefetch signal to the plurality of parallel processors to start prefetching of data from at least a portion of the plurality of partitioned memory modules.

5. The apparatus of claim 4, wherein the serial processor is further adapted to broadcast the prefetch signal to start data prefetching prior to broadcast of a spawn command.

6. The apparatus of claim 5, wherein the serial processor is further adapted to broadcast the spawn command when it is reached in the software program.

7. The apparatus of claim 1, wherein the prefetched data is stored in a second memory in at least one of the plurality of processors.

8. The apparatus of claim 1, wherein the transition from the serial processing mode to the parallel processing mode is performed when a spawn command is received by the plurality of parallel processors.

9. The apparatus of claim 1, wherein a plurality of threads are initiated in the plurality of parallel processors upon the transition to the parallel processing mode.

10. The apparatus of claim 1, wherein a plurality of threads are initiated substantially concurrently in the plurality of parallel processors upon switching to the parallel processing mode.

11. The apparatus of claim 1, wherein a transition from the parallel processing mode to the serial processing mode is performed when a join command has been received by all spawned threads.

12. The apparatus of claim 1, wherein the serial processor is configured to load data from the plurality of partitioned memory modules into the serial memory upon a transition from the parallel processing mode to the serial processing mode.

13. The apparatus of claim 1, further comprising an interconnection network configured to transfer data between or among the plurality of partitioned memory modules, the plurality of parallel processors, or the serial memory.

14. The apparatus of claim 1, wherein the serial processor is a master processor adapted to control the transition from the serial processing mode to the parallel processing mode.

15. The apparatus of claim 1, further comprising a broadcast network coupled to the serial processor and to the plurality of parallel processors, wherein instructions for the software program are broadcast to the plurality of parallel processors via the broadcast network.

16. The apparatus of claim 1, wherein the plurality of parallel processors comprise a plurality of thread control units adapted to execute instructions in the software program.

17. The apparatus of claim 1, wherein the serial memory is a level one cache memory.

18. The apparatus of claim 1, wherein the plurality of parallel processors are configured to write updated data to the at least a portion of the plurality of partitioned memory modules without writing to a local cache.

19. An apparatus comprising:
a serial processor adapted to execute software instructions in a software program primarily in serial;
a serial memory adapted to store data for use by the serial processor in executing the software instructions in serial;
a plurality of parallel processors adapted to execute software instructions in the software program primarily in parallel; and
a plurality of partitioned memory modules configured to store data for use by the plurality of parallel processors in executing the software instructions primarily in parallel;
wherein the serial processor is further adapted, prior to a transition from a serial processing mode to a parallel processing mode, to broadcast a prefetching signal to the plurality of parallel processors to initiate prefetching of data from at least a portion of the plurality of partitioned memory modules.

20. The apparatus of claim 19, wherein the serial processor is further adapted, prior to broadcast of the prefetching signal, to provide for a transfer of updated data from the serial memory to the plurality of partitioned memory modules and to receive corresponding acknowledgements from the plurality of partitioned memory modules that the updated data has been queued or committed prior to any memory requests from the plurality of parallel processors.

21. The apparatus of claim 19, wherein the serial processor is further adapted to broadcast a parallel processing initiation signal to the plurality of parallel processors for substantially concurrent initiation of the parallel processing mode.

22. The apparatus of claim 19, wherein the serial processor is further adapted to broadcast a pre-spawn command that causes pre-threads to be spawned to pre-fetch the data.

23. The apparatus of claim 22, wherein the pre-threads are replaces by threads upon transition to the parallel processing mode.

24. The apparatus of claim 19, wherein the prefetched data is stored in a second memory in at least one of the plurality of processors.

25. The apparatus of claim 19, wherein the transition from the serial processing mode to the parallel processing mode is performed when a spawn command is received by the plurality of parallel processors.

26. The apparatus of claim 19, wherein a plurality of threads are initiated substantially concurrently in thee plurality of parallel processors upon the transition to the parallel processing mode.

27. The apparatus of claim 19, wherein a transition from the primarily parallel processing mode to the primarily serial processing mode is performed when a join command is received in all threads.

28. The apparatus of claim 19, wherein the serial processor is configured to load data from the plurality of memory modules into the serial memory upon switching from the parallel processing mode to the serial processing mode.

29. The apparatus of claim 19, further comprising an interconnection network configured to transfer data from the plurality of memory modules to the plurality of parallel processors and/or the serial memory.

30. The apparatus of claim 19, wherein the serial processor is a master processor configured to control the transition from the serial processing mode to the parallel processing mode.

31. The apparatus of claim 19, wherein the plurality of parallel processors are configured to execute the software instructions in a substantially streaming manner.

32. An apparatus comprising:
an interconnection network;
a plurality of parallel processors coupled to the interconnection network and adapted to execute software instructions in the software program substantially in parallel;
a plurality of partitioned memory modules coupled to the interconnection network and adapted to store data for use by the plurality of parallel processors in executing the software instructions substantially in parallel;
a broadcast network coupled to the plurality of parallel processors;
a serial processor coupled to the broadcast network and adapted to execute software instructions in a software program primarily in serial; and
a serial memory coupled to the interconnection network and adapted to store data for use by the serial processor in executing the software instructions substantially in serial;
wherein the serial processor is further adapted, prior to a transition from a serial processing mode to a parallel processing mode, to provide for a transfer of updated data from the serial memory to the plurality of partitioned memory modules, to receive corresponding acknowledgements from the plurality of partitioned memory modules that the updated data has been queued or committed prior to any memory requests from the plurality of parallel processors, and to broadcast a prefetching signal to the plurality of parallel processors to initiate prefetching of data from at least a portion of the plurality of partitioned memory modules.

33. A method of transitioning from a serial processing mode to a parallel processing mode in a computing system, the method comprising:
transferring updated data from a serial memory to at least one of a plurality of partitioned memory modules;
receiving a corresponding acknowledgement from the at least one of the plurality of partitioned memory modules that the updated data has been queued or committed to be stored in memory, prior to any memory requests from the plurality of parallel processors;
broadcasting a first signal to the plurality of parallel processors to initiate prefetching of data from at least a portion of the plurality of partitioned memory modules; and
broadcasting a second signal to the plurality of parallel processors for substantially concurrent initiation of a parallel processing mode.

34. The method of claim 33, wherein the transfer of updated data from the serial memory to the plurality of partitioned memory modules is a data write back operation or a data write through operation.

35. The method of claim 34, wherein broadcasting the first signal to start data prefetching is prior to broadcast of the second signal command.

36. The method of claim 33, further comprising initiating a plurality of threads in the plurality of parallel processors upon the transition to the parallel processing mode.

37. The method of claim 33, further comprising performing a transition from the parallel processing mode to the serial processing mode when a join command has been received by all spawned threads.

38. The method of claim 33, further comprising loading data from the plurality of partitioned memory modules into the serial memory upon a transition from the parallel processing mode to the serial processing mode.

39. The method of claim 33, further comprising executing software instructions primarily in parallel in the parallel processing mode.

* * * * *